United States Patent [19]

Cummins

[11] Patent Number: 4,669,413
[45] Date of Patent: Jun. 2, 1987

[54] TRANSFER CHAMBER AND METHOD OF OPERATING SAME

[75] Inventor: Richard D. Cummins, Orchard Park, N.Y.

[73] Assignee: Moog Inc., East Aurora, N.Y.

[21] Appl. No.: 816,884

[22] Filed: Jan. 7, 1986

[51] Int. Cl.$^4$ .............................................. B64G 9/00
[52] U.S. Cl. ..................................... 114/335; 49/68; 244/158 R; 405/192
[58] Field of Search .................... 114/335; 244/158 R, 244/159, 161; 405/192; 49/68; 52/79.6; 414/217, 221

[56] References Cited

U.S. PATENT DOCUMENTS 2,807,056  9/1957  Vogt ........................................ 49/68
4,286,910  9/1981  Conrad .............................. 414/221

Primary Examiner—Sherman D. Basinger
Attorney, Agent, or Firm—Sommer & Sommer

[57] ABSTRACT

An improved transfer chamber for a space vehicle has an enclosure mounted on the hull of a spacecraft, and is provided with inner and outer doors. Two bladders are placed within this transfer chamber, and are selectively movable toward and away from one another. Conduits communicate these bladders with an outer reservoir exposed to space pressure, and with an inner reservoir exposed to cabin pressure. The conduits, bladders and reservoirs are all filled with liquid. When it is desired to egress an object from the cabin to space, liquid is pumped into the bladders, which move toward one another and deform about the object. This reduces the volume of air which is lost to space when the outer door is opened.

9 Claims, 7 Drawing Figures

TRANSFER CHAMBER AND METHOD OF OPERATING SAME

BACKGROUND OF THE INVENTION

1. Field of the Invention

This invention relates generally to the field of transfer chambers for passing objects between two differentially-pressurized environments, and, more particularly, to an improved transfer chamber for use in an orbiting space station.

2. Description of the Prior Art

It is sometimes desired to transfer an object from one environment to another environment, which is pressurized differently from the first. The first environment may, for example, be the cabin of a submerged object, and the other environment may be the surrounding liquid. Alternatively, the first environment may be a pressurized cabin of a spacecraft, and the other environment may be space. Technological developments in recent years have afforded the capability of extra-vehicular activity (EVA) from spacecraft. In this latter application, it has been deemed practical heretofore to simply provide an airlock chamber with inner and outer access doors. Since the number of egresses and ingresses through such an airlock has been somewhat limited, it has been deemed practical to simply provide the spacecraft with additional compressed air, to accommodate that which is lost when the outer door is opened to space.

However, present plans call for a permanently-orbiting space station in which the frequency of operation of such an airlock will likely be dramatically increased, and over a much greater length of time. For example, men, tools, and equipment may have to frequently passed through such airlock during the initial construction of the space station, and during its subsequent operation and repair. In such extended usage and operation, the cumulative effect of cabin air lost or vented to space when the outer door is opened, and/or the amount of energy conserved in evacuating the airlock prior to opening the outer door, may well become significant.

Upon information and belief, present plans for the space station call for the use of multi-stage pumps to partially evacuate the airlock, prior to opening to the outer door vent. However, it is not deemed practical to remove more than about 90% of the air in the airlock. Even so, due to the compressibility of air, the pump would have to be operated so as to pass a volume many times greater than the volume of the airlock. This greatly increases the size, complexity and energy requirements of the pump. Moreover, the pumping time needed to exhaust the chamber would be greatly extended, at the expense of limiting the frequency of operation and the stand-by capability of handling emergency transfers. Furthermore, while mechanical pumps must be lubricated, no liquid or vapor-producing lubricants can be used for fear of contaminating the purity of the cabin air.

SUMMARY OF THE INVENTION

The present invention provides an improved transfer chamber, and an improved method of operating a transfer chamber.

In one aspect, the improvement is provided in apparatus having a wall separating a first environment on one side thereof from a second environment on the other side thereof. The first environment is at a first pressure, and the second environment is at a different second pressure. A transfer chamber is provided for permitting an object to be transferred or passed from the first environment to the second environment, or vice versa. The transfer chamber has an enclosure mounted on the wall to form a sealed chamber therewith, and has a first door provided in the wall and communicating one of the environments with the chamber. A first door is selectively movable between a closed position at which the chamber will be sealingly separated from the one environment, and an open position at which access to the chamber may be had from the one environment. A second door is provided in the enclosure and selectively communicates the other of the environments with the chamber. The second door is selectively movable between a closed position at which the chamber will be sealingly separated from the other environment, and an open position at which access to the chamber may be had from the other environment. Vent means are operatively arranged to selectively equalize the pressure in the chamber with the pressure in either of the environments. In this form, the improvement broadly comprises at least one bladder arranged within the chamber, this bladder being selectively movable between a deflated position at which the volume occupied by the bladder is relatively small and an inflated position at which the volume occupied by the bladder is relatively large; a first reservoir having a first movable wall portion exposed to the first pressure, each bladder and the first reservoir being filled with a liquid; and a first conduit communicating each bladder with the first reservoir, this first conduit including a first pump selectively operable to pump liquid between the first reservoir and each bladder. When an object is placed in the chamber, the pump may be operated to cause each bladder to move from a fully- or partially-deflated position to its inflated position, deforming about an object in the chamber, while the chamber is vented to the first environment to reduce the volume of the chamber not occupied by the bladder and the object, prior to venting the chamber to the second environment.

In another aspect, the invention provides an improved method of operating such an improved transfer chamber. This improved method comprises the sequential steps of: moving each bladder to a deflated position; equalizing the pressure in the chamber with the pressure in one of the environments; opening the door which communicates with the one environment; placing an object within the chamber; closing such door; moving the bladder to its inflated position so as to reduce the volume of the chamber which is not occupied by the bladder and the object; equalizing the pressure in the chamber with the pressure of the other of the environments; moving the bladder to a deflated position; opening the other door; and removing the object from the chamber through such the door.

Accordingly, a general object of the invention is to provide an improved transfer chamber and method of operating same.

Another object is to provide an improved transfer chamber, and method of operating same, which is particularly adapted for use in a permanently-orbiting space station.

Another object is to provide an improved transfer chamber for use in a space station, which transfer chamber conserves cabin air and reduces the energy consumed in ingressing and egressing an object.

Still another object is to provide an improved transfer chamber which is a completely closed system, and which does not risk contaminating the purity of cabin air.

These and other objects and advantages will become apparent from the foregoing and ongoing written specification, the drawings, and the appended claims.

DESCRIPTION OF THE PREFERRED EMBODIMENTS

Figure 1:
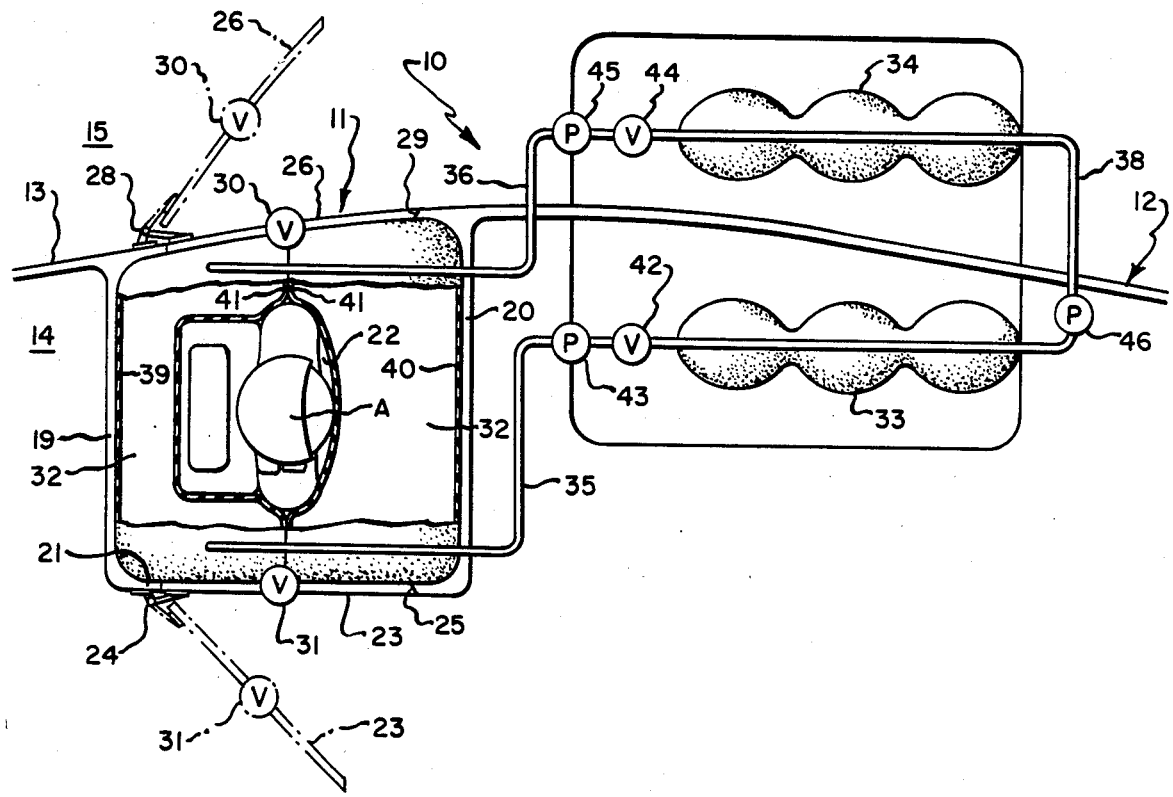
FIG. 1 is a fragmentary schematic top plan view of the improved transfer chamber, with portions thereof removed for clarity of illustration, this view showing the opposing bladders as having been inflated and deforming about an astronaut, and also showing the cabin and space reservoirs and the associated first and second conduits.

At the outset, it should be clearly understood that like reference numerals are intended to identify the same structural elements, portions or surfaces consistently throughout the several drawing figures, as such elements, portions or surfaces may be further described by the entire written specification, of which this detailed description is an integral part. Unless otherwise indicated, the drawings are intended to be read (e.g., cross-hatching, arrangement of parts, etc.) together with the specification, and are to be considered a portion of the entire "written description" of this invention, as required by 35 U.S.C. § 112. As used in the following description, the terms "horizontal", "vertical", "left", "right", "up" and "down", as well as adjectival and adverbial derivatives thereof (e.g., "horizontally", "rightwardly", "upwardly", etc.) refer to the orientation of the illustrated structure as the particular drawing figure faces the reader.

Referred now to the drawings, and, more particularly, to FIG. 1 thereof, this invention provides an improvement, of which the presently-preferred embodiment is generally indicated at 10, for use in a transfer chamber 11, such as used in a spacecraft 12. However, this particular application is merely illustrative, and the invention is deemed to have utility in other fields as well. Moreover, the illustrated embodiment is deemed to be only one possible species of a broader class or genus which the claims are intended to cover. Hence, the scope of the appended claims shoulder not be construed as being limited to the illustrated species, or to the illustrated application therefor, unless an express limitation to that effect appears therein.

In FIG. 1, the form of the host apparatus is a spacecraft 12 having a hull or a wall 13 which separates an inner or first environment, generally indicated at 14, from an outer or second environment, generally indicated at 15. In the illustrated embodiment, the first environment is the pressurized interior cabin of the spacecraft, which is assumed to be at some cabin pressure $P_i$, while the second environment is space, which is assumed at some substantially lower pressure $P_o$. For practical purposes, $P_o$ may be regarded as being at zero pressure.

The transfer chamber 11 is provided to permit an object, such as an astronaut A, to pass between the first and second environments, without an undue loss of cabin pressure. To this end, the transfer chamber is formed by a box-like enclosure mounted on the inside surface of hull 13. This enclosure is shown as having a horizontal planar bottom 16 (FIG. 2), a horizontal planar top 18 spaced vertically thereabove (FIG. 2), and a U-shaped side wall structure joining the top and bottom. Specifically, this side wall structure includes planar vertical left, right and inner walls 19,20,21, respectively (FIG. 1). The various adjacent marginal end portions of the top, bottom and side walls, are suitably joined together. Moreover, the outwardly-extending marginal edges of the top, bottom, left wall and right wall, are suitably secured to the interior of hull 13 so as to form a sealed chamber 22 between the hull and the enclosure.

Figure 4:
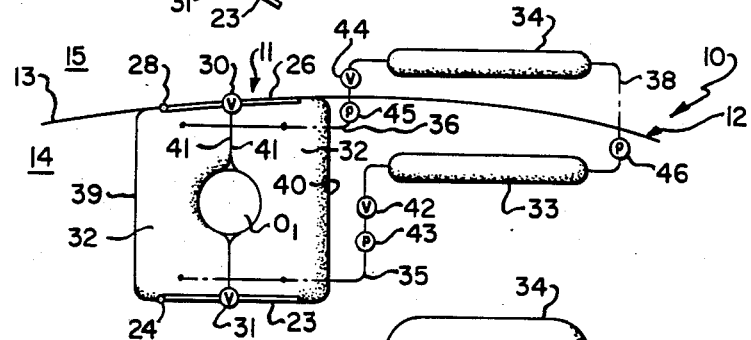
FIG. 4 is a schematic view similar to FIG. 3, but showing the inner door as having been closed, showing the opposing bladders as having been moved toward one another and deforming about the object, and showing the inner reservoir as having been deflated.

A first door 23 is pivotally mounted on hinges 24, and is operatively arranged to be moved relative to an opening 25 provided through the enclosure inner wall 21. Specifically, door 23 is selectively movable between a closed position (as shown in FIGS. 1 and 4), at which the chamber 22 will be sealingly separated from the cabin environment, and an open position (as shown in phantom in FIG. 1 and in solid FIG. 7), at which access to chamber 22 may be had from the cabin environment.

Figure 3:
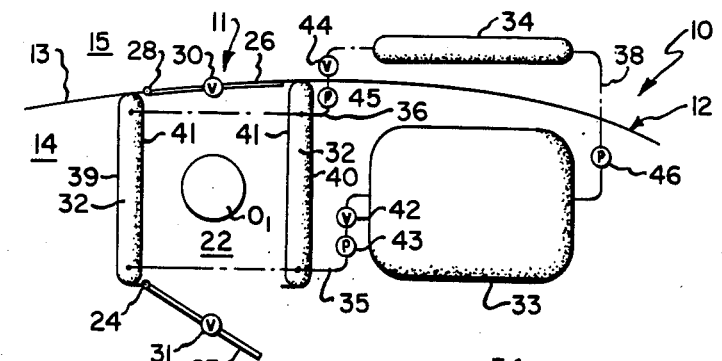
FIG. 3 is a schematic view of the improved transfer chamber, generally similar to FIG. 1, but showing the bladders in their fully-deflated positions, showing the inner reservoir as having been inflated, and further showing the inner door as being opened.

A second or outer door 26 is pivotally mounted on hinges 28 and is operatively arranged to moved relative to an opening 29 provided in the enclosed portion of the hull. Similarly, door 26 may be selectively moved between a closed position (as shown in FIGS. 1 and 3), at which chamber 22 will be sealingly separated from the space environment, and an open position (as shown in phantom in FIG. 1 and in solid in FIG. 5), at which access to chamber 22 may be had from the space environment.

Each door is schematically shown as carrying a suitable normally-closed vent valve, which is selectively operable to permit the pressure in chamber 22 to equalize with the pressure of the proximate environment. Thus, if both doors are closed and if outer door vent valve 30 is opened, the pressure in chamber 22 will equalize with the outer pressure $P_o$, and will fall to zero. In effect, any air in chamber 22 will be lost to space. Alternatively, if inner door vent valve 31 is open, the pressure in chamber 22 will equalize with the cabin pressure $P_i$. In this situation, air will flow from the cabin through valve 31 to occupy chamber 22. Persons skilled in this art will appreciate that the specific placement of vent valves 30,31 in the chamber doors is schematic and only to illustrate the salient principle of operation in the improvement. Such valves could be located elsewhere, and operated either manually or automatically. Similarly, while the enclosure is shown as being mounted interiorly of the spacecraft, such enclosure could alternatively be mounted on the outside of hull 13, on an airlock detachable from such spacecraft, or on some other host structure.

In any event, prior art forms of airlocks or transfer chambers are believed to have contemplated such an enclosure mounted on the hull of a vehicle or host structure, and provided with inner and outer doors communicating with an internal sealed chamber. However, such transfer chambers had to have an internal volume large enough to accommodate a wide variety of objects ingressing or egressing the vehicle. This was believed to have been unduly wasteful of energy in the form of cabin air which was lost to space whenever an object was passed through the transfer chamber. In other words, every time the inner door vent was opened, air flowed from the cabin into the chamber to equalize the chamber pressure with the cabin pressure. The volume of air needed to so pressurize the transfer chamber was largely a function of the size of the object(s) being transferred. If the transfer chamber had one volume, and the object being transferred occupied another volume, the difference between these two volumes represented a net volume which had to be filled with pressurized cabin air. If the object was physically small, this net volume was relatively large; if the object was larger, this net volume was smaller. Moreover, the amount of air lost during each transfer was magnified by the frequency of such transfers. Some applications may have contemplated that air be pumped from chamber 22 into the cabin, prior to opening the outer door. However, this pumping was unduly wasteful of energy. In earlier forms of spacecraft, the missions contemplated only a small number of extra-vehicular activities, and the object transferred was typically an astronaut. However, present plans call for a space station to orbit the earth for an indefinite period of time. During the initial construction of such a space station, and thereafter during its routine maintenance, repair and operation, it is contemplated that the number of ingress and egress transfer from and to the cabin will dramatically increase. Moreover, it is also contemplated that the type and size of objects being transferred may be more varied than on earlier missions. Therefore, in summary, the amount of energy consumed by operation of such prior art transfer chambers was related to the net volume of the chamber which has to be pressurized to the cabin pressure, multiplied by the number of times of operation. At the same time, the total volume of pressurized air needed to operate the chamber represented weight, usually in the form of cylinders or containers of highly-pressurized air or oxygen, which had to be initially lifted into orbit.

The present invention provides an improved transfer chamber which will consume a smaller amount of chamber-pressurizing air during each ingress-egress, sequence and will therefore be more suitable to long-term operation, as in such a permanently-orbiting space station.

Figure 2:
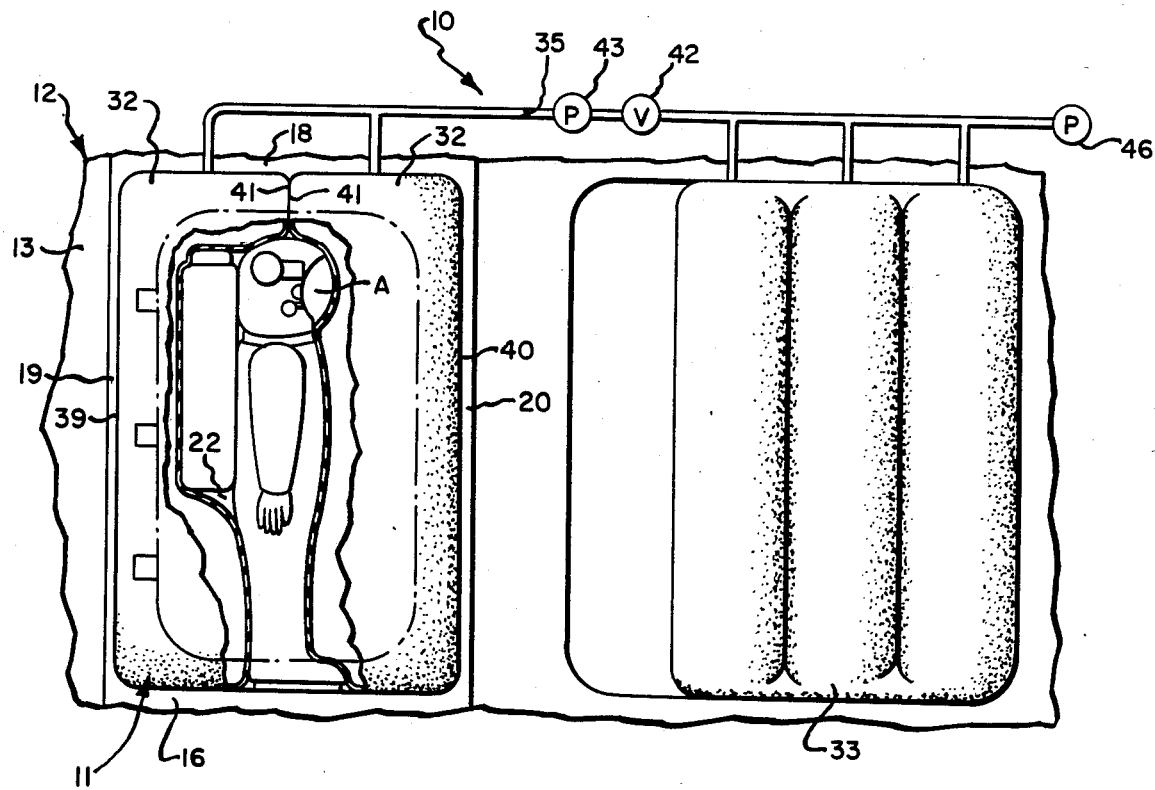
FIG. 2 is a fragmentary schematic vertical sectional view thereof, this view showing the transfer chamber in central vertical section, but showing the cabin reservoir in elevation.

Referring now to FIGS. 1 and 2, the improvement broadly includes two opposed bladders 32,32 arranged within the transfer chamber, a first or inner reservoir 33 exposed to cabin pressure $P_i$, a second or outer reservoir 34 exposed to ambient space pressure $P_o$, a first conduit 35 communicating each of the bladders with the first reservoir, a second conduit 36 communicating each of the bladders with the second reservoir 34, and a transfer conduit 38 communicating the two reservoirs with one another.

Figure 5:
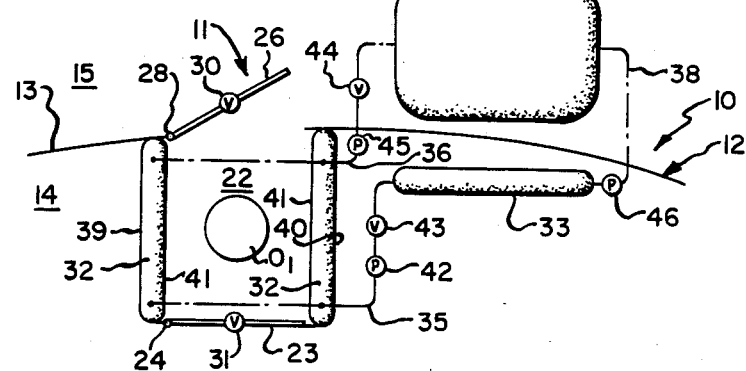
FIG. 5 is a schematic view generally similar to FIG. 4, but showing the bladders as having been again moved to their fully-deflated positions, showing the outer reservoir as having been inflated, and further showing the outer door as having been opened to permit egress of the object.
Figure 7:
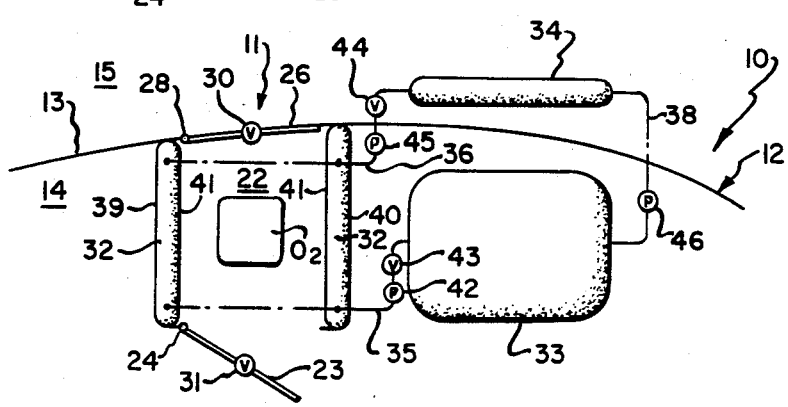
FIG. 7 is a schematic view generally similar to FIG. 6, but showing the bladders as having been fully-deflated when liquid has been pumped therefrom into the now-inflated inner reservoir, and further showing the inner door as having been opened to permit ingress of the object.

Bladders 32,32 are shown as being operatively positioned within the transfer chamber for selective movement toward and away from one another in a horizontal direction. Specifically, the left bladder has a surface 39 suitably secured to enclosure planar left wall 19, while the right bladder has a surface 40 secured to enclosure planar right wall 20. As shown in FIG. 2, these two bladders occupy the entire vertical height of the transfer chamber between the bottom and top thereof. These bladders are formed of a suitable flexible material, such a rubber, plastic or the like, and are arranged to contain a suitable fluid, preferably an imcompressible liquid. Thus, if such liquid is withdrawn from bladders 32,32, the bladders will be moved toward retracted or deflated positions, as shown in FIGS. 3, 5 and 7.

Alternatively, liquid may be pumped into such bladders to cause them to move toward their expanded positions, as shown in FIGS. 1, 2, 4 and 6. Thus, when fluid is pumped from the bladders, the facing surfaces 41,41 thereof move away from one another. However, when fluid is pumped into the bladders, such facing surfaces 41,41 move toward and ultimately contact one another approximately mid-way between enclosure walls 19,20. However, if an object is positioned within the transfer chambers, these two bladders will conform to the general shape of the object, as representatively shown in FIGS. 1, 2, 4 and 6. This feature reduces the volume of the transfer chamber which is not occupied by the object and the inflated bladders. In the preferred embodiment, two such bladders are arranged so as to move toward and away from one another. However, it is readily apparent that a greater or lesser number of such bladders could be alternatively employed. Also, while the use of a flexible material for such bladders is presently preferred, so that the inflated bladders will deform about, and conform to, the general shape of the object, this arrangement is not invariable.

In the preferred embodiment, each of reservoirs 33,34 is shown as being another form of bladder-like element having a flexible wall and containing the serviced liquid. As previously noted, the first or inner reservoir 33 is exposed to cabin pressure $P_i$ on its entire outer pressure, while the second or outer reservoir 34 is exposed to outer or space pressure $P_o$, which is assumed to be zero for practical purposes, on its entire outer surface. While this form of reservoir is presently preferred, it may be readily changed. However, each reservoir should have at least a portion of its enclosing wall configured as a movable portion and exposed to the associated pressure, either $P_i$ or $P_o$ as appropriate, so as to pressurize the liquid within the bladder to such associated pressure.

Each reservoir is movable between an inflated and a deflated position. The cabin reservoir 33 is schematically shown as being in its inflated condition in FIGS. 3 and 7, and in its deflated condition in FIGS. 4–6. Conversely, the outer reservoir 34 is shown as being in its inflated condition in FIG. 5, and in its deflated condition in FIGS. 3-4 and 6-7.

The first conduit 35 communicates each of bladders 32,32 with the inner reservoir 33, and is shown as containing a valve 42 and a reversible pump 43 to control the flow of liquid through the first conduit. Similarly, the second conduit 36 separately communicates each of bladders 32,32 with the second reservoir 34, and includes a valve 44 and reversible pump 45 for controlling the flow of liquid through the second conduit.

As best shown in FIG. 1, the transfer conduit 38 communicates the first and second reservoirs 33,34, and includes a pump 46. Pump 46 may be selectively operated to pump liquid from the outer reservoir 34 to the cabin reservoir 33. Persons skilled in this art will readily appreciate that suitable circuitry (not shown) is associated with valves 42,44, and with pumps 43,45,46, to control the operation and sequence of these elements.

The operation of the improved structure is comparatively illustrated in FIGS. 3-7.

Assume that the apparatus is initially in the condition shown in FIG. 3. In this condition, the two bladders 32,32 are shown as being in their fully-deflated positions, the outer door vent is closed, and most of the liquid is in the cabin reservoir. Valves 42,44 are closed, and pump 43,45 and 46 are not operating. FIG. 3 also illustrates the cabin door as being open, so that an object $O_1$ may be placed within the transfer chamber. When this is done, the inner door is then closed. Thereafter, the cabin door vent is opened, valve 42 is opened, and pump 43 is operated to pump liquid from the cabin reservoir to the two bladders. As liquid is pumped into the bladders, they being to expand in volume and begin to move toward one another. Any air in the collapsing cavity between the expanding bladders and the object, is permitted to pass through the inner door vent back into the cabin. Ultimately, the expanding bladders will contact one another, and will deform about the outer shape of the object, as shown in FIG. 4. When this occurs, the volume of the chamber which is not occupied by the expanded bladders and the object, will be reduced to a practical minimum. Valve 42 is then closed, pump 43 is deenergized, and the cabin door vent is then closed.

Thereafter, the outer door vent is open to permit the pressure in the cavity to equalize with the outer pressure $P_o$. Thus, the pressure in this cavity will readily fall from $P_i$ to zero, as the air within the cavity is lost to space. Thereafter, valve 44 is opened, and pump 45 is operated to pump fluid from the bladders to the outer reservoir 34. However, because the same external pressure $P_o$ acts on the exterior of the bladders and the outer reservoir, pump 43 requires comparatively little energy to pump liquid from the bladders to the outer reservoir. Ultimately, the bladders will be moved to their deflated positions, with the liquid displaced therefrom being transferred to outer reservoir 34. The outer door may then be opened to permit egress of an object, as shown in FIG. 5.

Figure 6:
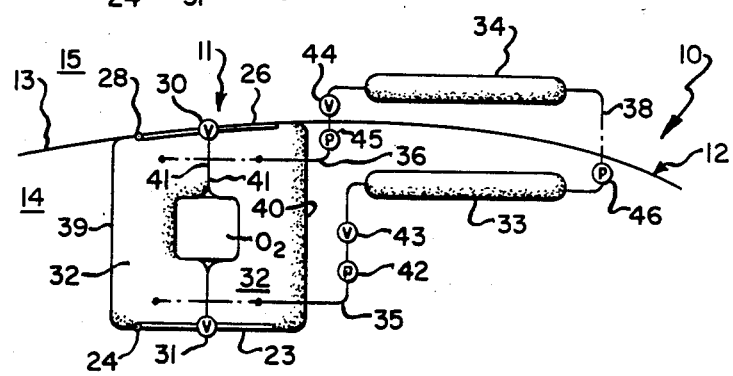
FIG. 6 is a schematic view similar to FIG. 5, but showing the outer door as having been closed, showing the outer reservoir as having been deflated, and further showing the opposed bladders as having been inflated so as to again deform about the object.

To transfer an object $O_2$ back into the cabin, such object is again placed in the chamber when the various elements are in the condition shown in FIG. 5. The outer door and the outer vent are then closed. Since the pressure in the transfer chamber is now at $P_o$, while the pressure in the inner reservoir is at $P_i$, valve 42 need only be opened to permit fluid to flow from inner reservoir 33 into the bladders. As this occurs, bladders 32,32 begin to expand and move toward one another, and ultimately deform about the object, as shown in FIG. 6. Inner door vent 31 is then opened to permit air to enter the cavity or volume of the transfer chamber which is not occupied by the object and the expanded bladders. Valve 42 is opened, and pump 43 is operated, to pump liquid from the bladders into the inner reservoir. As this occurs, the bladders begin to move both toward their retracted positions. At the same time, cabin air is admitted through inner door vent 31 to the expanding cavity within the transfer chamber. When the bladders have been moved sufficiently to this fully- or partially-deflated positions, inner door 23 may be open to permit transfer of the object from the chamber to the cabin.

It should be understood that the operation of pumps 43,45, in the above sequence requires comparatively little energy because liquid is simply being displaced from the bladders to the appropriate reservoir, or vice versa, when such bladders and reservoirs are exposed to a substantially constant external pressure. In other words, pumps 43,45 do not have to pump such liquid "up hill" against a pressure differential. Hence, the energy consumed by these pumps will be that needed to supply displace the liquid from the bladders to the associated reservoir. Bladder transfer pump 46 will, however, have to pump liquid from the outer reservoir to the inner reservoir against the differential of pressures $P_i - P_o$, which pressures act on the outer surfaces of inner and outer reservoirs, respectively. However, transfer pump 46 is only used if it is desired to sequentially pass objects in the same direction (i.e., from the cabin to space, or vice versa) and the total volume of such objects exceeds the volumetric capacity of the appropriate reservoir. Since the bladders 32,32 must be retracted only by an amount sufficient to accommodate the size of the object passing through the chamber, it is entirely possible that a number of small objects may be sequentially passed in the same direction before the aggregate volume of liquid in the appropriate reservoir has been consumed. On the other hand, if the transfer chamber is operated such that the ingress and egress operations alternate with one another, it may not be necessary to operate transfer pump 46. Moreover, the volume that is forced from the chamber in the cabin when the bladders expand with the cabin vent open, partially compensates for the volume of air that must flow from the cabin into the transfer chamber when this sequence is reversed.

Accordingly, the principal function of the improvement is to reduce the volume of pressurized air which is consumed during ingress or egress of an object. This function is accomplished by providing expanding bladders so as to reduce the volume of the transfer chamber which is not occupied by an object or the expanded bladders, prior to loss of such reduced volume of pressurized air to space. The reduction in energy consumption may be partially offset by the weight of liquid, which must be placed into orbit. However, such liquid may be used for other purposes. For example, the liquid may be potable or waste water, or some other liquid. As indicated above, the bladders need not be fully-deflated in every event. Such bladders need only be deflated or retracted sufficiently to permit the object to be placed in, or taken from, the chamber.

Therefore, while a preferred embodiment of the improvement has been shown and described, and several modifications thereof discussed, persons skilled in this art will readily appreciate that various additional changes and modifications may be made without departing from the spirit of the invention, as defined and differentiated by the following claims.

What is claimed is:

1. In apparatus having a wall separating a first environment on one side thereof from a second environment on the other side thereof, said first environment being at a first pressure and said second environment being at a second pressure, and including a transfer chamber for permitting an object to be transferred from said first environment to said second environment, said transfer chamber having an enclosure mounted on said wall to form a sealed chamber therewith, having a first door provided in said wall and communicating one of said environments with said chamber, said first door being selectively movable between a closed position at which said chamber will be sealingly separated from said one environment and an open position at which access to said chamber may be had from said one environment, and having a second door provided in said enclosure and selectively communicating the other of said environments with said chamber, said second door being selectively movable between a closed position at which said chamber will be sealingly separated from said other environment and an open position at which access to said chamber may be had from said other environment, and having vent means operatively arranged to selectively equalize the pressure in said chamber with the pressure of either of said environments the improvement which comprises:

at least one bladder arranged within said chamber, said bladder being selectively movable between a deflated position at which the volume occupied by said bladder is relatively small and an inflated position at which the volume occupied by said bladder is relatively large;

a first reservoir having a first movable wall portion exposed to said first pressure, each bladder and said first reservoir being filled with a liquid; and a first conduit communicating each bladder with said first reservoir, said first conduit having a first pump selectively operable to pump liquid between said first reservoir to said each bladder;

whereby, when an object is placed in said chamber, said pump may be operated to cause each bladder to move from said deflated position to said inflated position while said chamber is vented to said first environment, to reduce the volume of said chamber not occupied by said bladder and said object prior to venting said chamber to said second environment.

2. The improvement as set forth in claim 1 wherein said first conduit includes a first valve selectively operable between an open condition at which said first reservoir will communicate with each bladder, and a closed condition at which said first reservoir will not communicate with each bladder.

3. The improvement as set forth in claim 1 and further comprising:

a second reservoir having a second movable wall portion exposed to said second pressure, said second reservoir being also filled with said liquid; and a second conduit communicating each bladder with said second reservoir, said second conduit having a second pump operatively arranged to pump liquid between said second reservoir and each bladder.

4. The improvement as set forth in claim 3 wherein said second conduit includes a second valve selectively operable between an open conduit at which said second reservoir will communicate with each bladder, and a closed condition at which said second reservoir will not communicate with each bladder.

5. The improvement as set forth in claim 3 and further comprising a transfer conduit communicating said first and second reservoirs, said transfer conduit having a transfer pump selectively operable to pump liquid from said second reservoir to said first reservoir.

6. The improvement as set forth in claim 1 wherein each bladder has a wall portion which is arranged to deform about the contour of such object when in its inflated position.

7. The improvement as set forth in claim 1 wherein the improvement has two of said bladders, and wherein each of said bladders has a movable wall portion arranged to move toward the movable wall portion of the other of said bladders when said bladders are inflated.

8. The method of transferring an object through a transfer chamber from a first environment to a second environment, said chamber being formed by an enclosure mounted on a containment wall separating said environments and having a first door communicating said chamber with said first environment and having a second door communicating said chamber with said second environment, said first environment being at a first pressure and said second environment being at a second pressure, and wherein at least one bladder is positioned within said chamber and is selectively movable between a deflated position at which the volume occupied by said bladder is relatively small and an inflated position at which the volume occupied by said bladder is relatively large, which method comprises the steps of:

deflating each bladder;
equalizing the pressure in said chamber with the pressure in one of said environments;
opening the one of said doors which communicates with said one environment;
placing an object within said chamber;
closing said one door;
inflating each bladder so as to reduce the volume of said chamber which is not occupied by each bladder and said object;
equalizing the pressure in said chamber with the pressure of the other of said environments;
deflating each bladder;
opening the other of said doors; and
removing said object from said chamber through said other door.

9. The method as set forth in claim 8 comprising the further step of:

deforming each bladder about said object when each bladder is inflated.

* * * * *